United States Patent
Harada et al.

(10) Patent No.: US 7,313,138 B2
(45) Date of Patent: Dec. 25, 2007

(54) ROUTER DEVICE AND ROUTING METHOD

(75) Inventors: Shinsuke Harada, Tokyo (JP);
Takeharu Yasuda, Tokyo (JP)

(73) Assignee: NEC Corporation, Tokyo (JP)

( * ) Notice: Subject to any disclaimer, the term of this patent is extended or adjusted under 35 U.S.C. 154(b) by 922 days.

(21) Appl. No.: 10/462,721

(22) Filed: Jun. 17, 2003

(65) Prior Publication Data

US 2003/0231628 A1    Dec. 18, 2003

(30) Foreign Application Priority Data

Jun. 17, 2002   (JP)   ............................. 2002-175777

(51) Int. Cl.
*H04L 12/28* (2006.01)

(52) U.S. Cl. ...................... 370/392; 370/401
(58) Field of Classification Search ............... 370/389, 370/392, 400, 401, 402, 403, 404
See application file for complete search history.

(56) References Cited

U.S. PATENT DOCUMENTS

| 6,633,902 B1 * | 10/2003 | Asano et al. ............... 709/203 |
| 6,792,471 B2 * | 9/2004 | Nomura et al. ............. 709/238 |
| 7,039,766 B1 * | 5/2006 | Smith ......................... 711/137 |
| 2005/0120134 A1 * | 6/2005 | Hubis ......................... 709/238 |

FOREIGN PATENT DOCUMENTS

| JP | 6-69928 | 3/1994 |
| JP | 6-261078 | 9/1994 |
| JP | 8-223207 | 8/1996 |
| JP | 2000-83055 | 3/2000 |
| JP | 2000-138687 | 5/2000 |

* cited by examiner

*Primary Examiner*—Chau Nguyen
*Assistant Examiner*—Dargaye H Churnet
(74) *Attorney, Agent, or Firm*—Young & Thompson

(57) ABSTRACT

A routing device includes a memory for storing routing entries in a routing table and a cache memory for storing some of routing entries present in the memory together with a mask length of a destination address as a cache entry. A high-speed retrieval section retrieves the cache entry corresponding to the destination address by referencing the cache memory based on the destination address of an input packet. An ordinary retrieval section retrieves the routing entry corresponding to the destination address by referencing the memory. A processing section writes the cache entry into the cache memory based on the routing entry retrieved by the ordinary retrieval section. The router device enables routing without using a routing entry that should not be used in the routing originally even when part of the routing table is cached.

12 Claims, 8 Drawing Sheets

ROUTER DEVICE AND ROUTING METHOD

BACKGROUND OF THE INVENTION

1. Field of the Invention

The present invention relates to a router device and routing method for routing a packet via an IP (Internet Protocol) network by using cache entries in a cache memory corresponding to some of the routing entries in a routing table that includes routing information relating a destination IP address of the packet to a routing path such as next hop or adjacent router connected to the router device.

2. Description of the Related Art

Conventionally, there has been one method available for performing a routing processing by using the exclusive hardware in order to produce a high-speed router device. In the method, the router device has large routing tables, so that the exclusive hardware needs to be configured to be of a mass capacity in order to store all of the routing tables in its limited storage capacity, thereby becoming very expensive.

In relation to the above conventional method, such a configuration has been employed that software thereof holds all of the routing tables in order to produce not only a high-speed but also inexpensive router device. In the configuration, the router device caches routing entries of some of these routing tables that have a high usage frequency into the dedicated hardware. The routing tables of the software may be searched if information of interest cannot be obtained upon retrieval by the dedicated hardware.

The above conventional technologies, however, have the following problems. The above method of searching the routing tables is based on a characteristic of a longest prefix match principle (hereinafter referred to as "longest match"). In the longest match, it is necessary to employ a routing entry having a higher priority than the routing entries that have a plurality of matched conditions, that is, to employ such a routing entry so as to have a long network address mask.

There is available a CAM (Content-Addressable Memory) that can perform such a longest match and is provided with a three-valued retrieval capability. However, the CAM is expensive and has a small capacity, so that taking into account problems, to be solved, of a large power dissipation and a large mounting area on a board at the time of mounting. Accordingly, it becomes preferable to use hardware having an inexpensive and general-purpose full-match retrieval capability in order to construct a small and inexpensive device.

Further, if one routing entry present in the routing table is to be cached in a case where such a CAM is used, there occurs a possibility that routing may be performed mistakenly using this cached routing entry because those routing entries that have a higher priority than this cached routing entry are not cached.

To prevent this, it becomes necessary to simultaneously cache into the CAM all of the related routing entries having a higher priority than the cached routing entry. Consequently, the CAM cannot be used in a network having a larger number of routing tables than the number of the cache entries.

For example, in a router device provided with a default gateway and 100 routing entries, it becomes necessary to cache all of the 100 routing entries in order to cache the default gateway.

The routing table, therefore, is cached, in a popular manner, to a destination IP address of a processed packet, in which case, however, the cache entries are not masked. Therefore, if communication to a plurality of destination IP addresses routed using the same routing entry is cached, such an event may happen that the same number of cache entries as the number of these destination IP addresses are created.

In such a case, an originally small storage capacity of the dedicated hardware is decreased and, at the same time, a retrieval-hit ratio is not improved to thus increase a write frequency and decrease a cache-usage efficiency, thereby degrading a throughput.

SUMMARY OF THE INVENTION

Therefore, it is an object of the present invention to enable routing without using a routing entry that should not be used in the routing originally even when part of a routing table is cached as well as suppressing usage quantity of the cache entries to improve their usage efficiency.

To solve the problems, the present invention has been developed and provides A router device for routing a packet based on its destination address, comprising: a routing table for storing routing entries including routing information relating the destination address of the packet to a routing path; a cache memory for storing some of routing entries in the routing table together with mask-length information of the destination address as a cache entry; a first retrieval section for retrieving the cache entry which corresponds to the destination address of the packet by making reference to the cache memory based on the destination address; a second retrieval section for retrieving the routing entry which corresponds to the destination address by making reference to the routing table; a storage section for storing the routing entry retrieved by the second retrieval section together with the mask-length information of the destination address as the cache entry in the cache memory; and an output section for outputting a retrieval result sent from the first or second retrieval section.

That is, the present invention speeds up routing processing by caching into the high-speed cache memory the routing entry having a high reference frequency present in the routing table that features a longest match of, for example, an IP address. Further, IP address information is registered together with the mask-length information of the IP address in the cache table, so that if there is the routing entry that has a possibility of a longer match, all of the related entries are registered in the cache table to retrieve the cache entry, recognizing presence of the plurality of entries which are related in realization of the longest match.

Specifically, the process sequentially retrieves the routing entries starting from the one having a smaller mask length to perform longest match processing. Further, the process creates a virtual routing entry not present in the actual routing table, thereby solving a priority problem in the longest match when performing partial caching.

The present invention attempts to thus reduce the number of the entries in the cache memory to a minimum required value, thereby reducing an entry retrieval time and improving a usage efficiency of the cache memory.

DESCRIPTION OF THE PREFERRED EMBODIMENTS

The following will describe embodiments of the present invention with reference to drawings.

[Explanation of Configuration]

Figure 1:
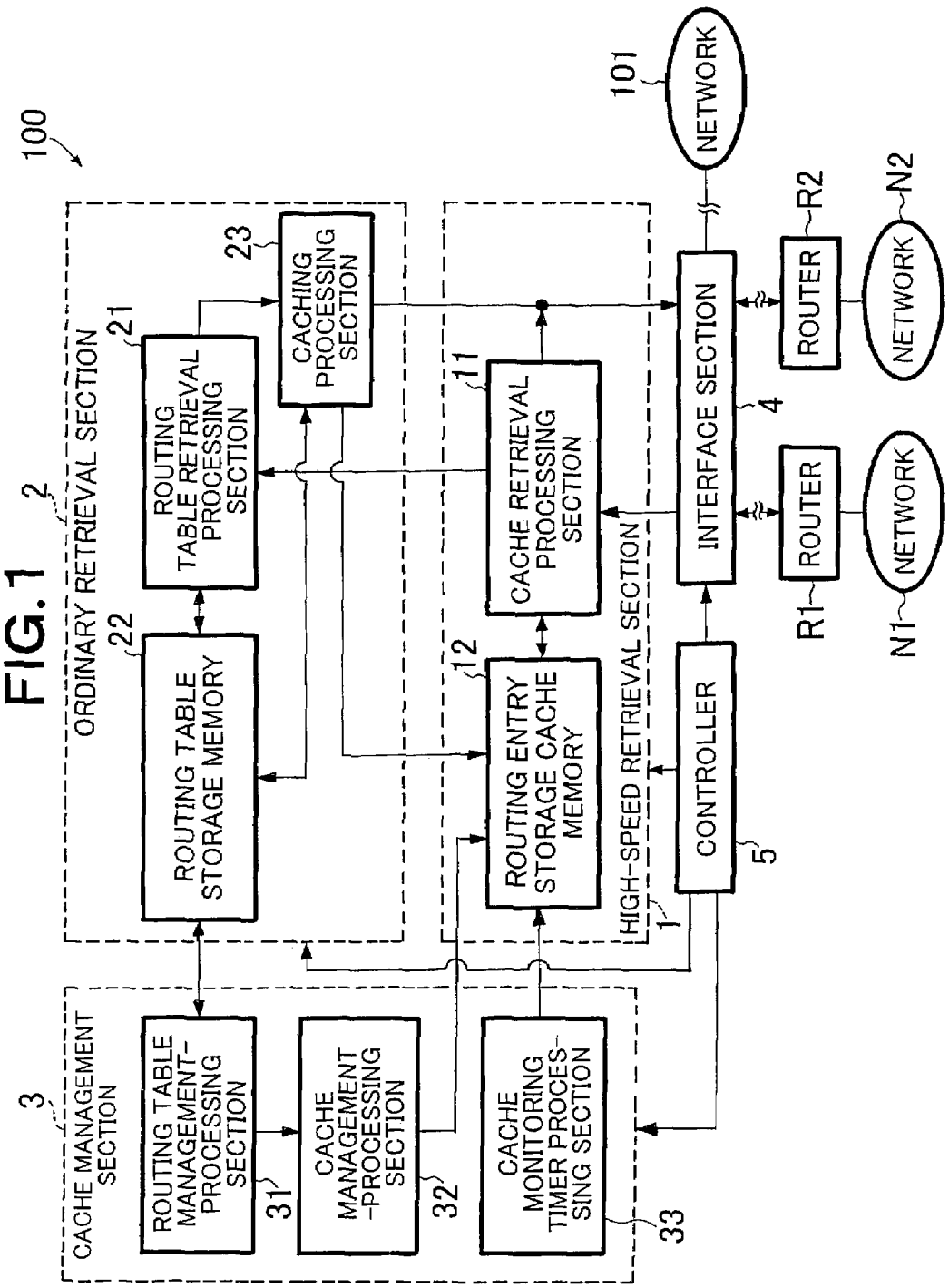
FIG. 1 is a functional block diagram for showing a schematic internal configuration of a router device according to an embodiment of the present invention.

FIG. 1 is a functional block diagram showing a schematic internal configuration of a router device according to an embodiment of the present invention. In the embodiment, a router device 100 is connected to a network such as a local area network (LAN) 101. This device 100 is also connected to a plurality of two adjacent routers R1 and R2 each connected to the networks N1 and N2 such as a LAN respectively. In the device 100, a packet is input from the network 100 or any one of the adjacent routers R1 and R2, and then a routing path (next hop or adjacent router) of the packet is selected by searching entries in a cache memory or a routing table according to a destination IP address of the packet, whereby the packet is output to the network 100, the routers R1 or R2 corresponding to the selected routing path.

In FIG. 1, the router device 100 functionally includes a high-speed retrieval section 1, an ordinary retrieval section 2 connected to the section 1, and a cache management section 3 connected to the sections 1 and 2. The high-speed retrieval section 1 is a first retrieval section for performing search by using a cache memory. The ordinary retrieval section 2 is a second retrieval section for searching a routing table that has not been able to be searched in the cache memory. The cache management section 3 is configured to manage a state of the cache memory.

In FIG. 1, the device 100 has also an interface section 4 including an input interface and an output interface connected to the section 1 and 2, and a controller 5 connected to the sections 1 to 4. The interface section 4 is also connected to the network 100 and two adjacent routers R1 and R2. The controller 5 controls operations of the sections 1 to 4.

The high-speed retrieval section 1 comprises a routing entry storage cache memory (cache memory) 12 and a cache retrieval-processing section 11.

The cache memory 12 stores some of the routing entries present in a routing table 22 of the ordinary retrieval section 2.

The cache retrieval-processing section 11 performs retrieval processing on the cache memory 12 in response to a retrieval request for a destination IP address of an input packet, to output a retrieval result or make a retrieval request to the ordinary retrieval section 2 depending on a result of the retrieval processing.

Figure 2:
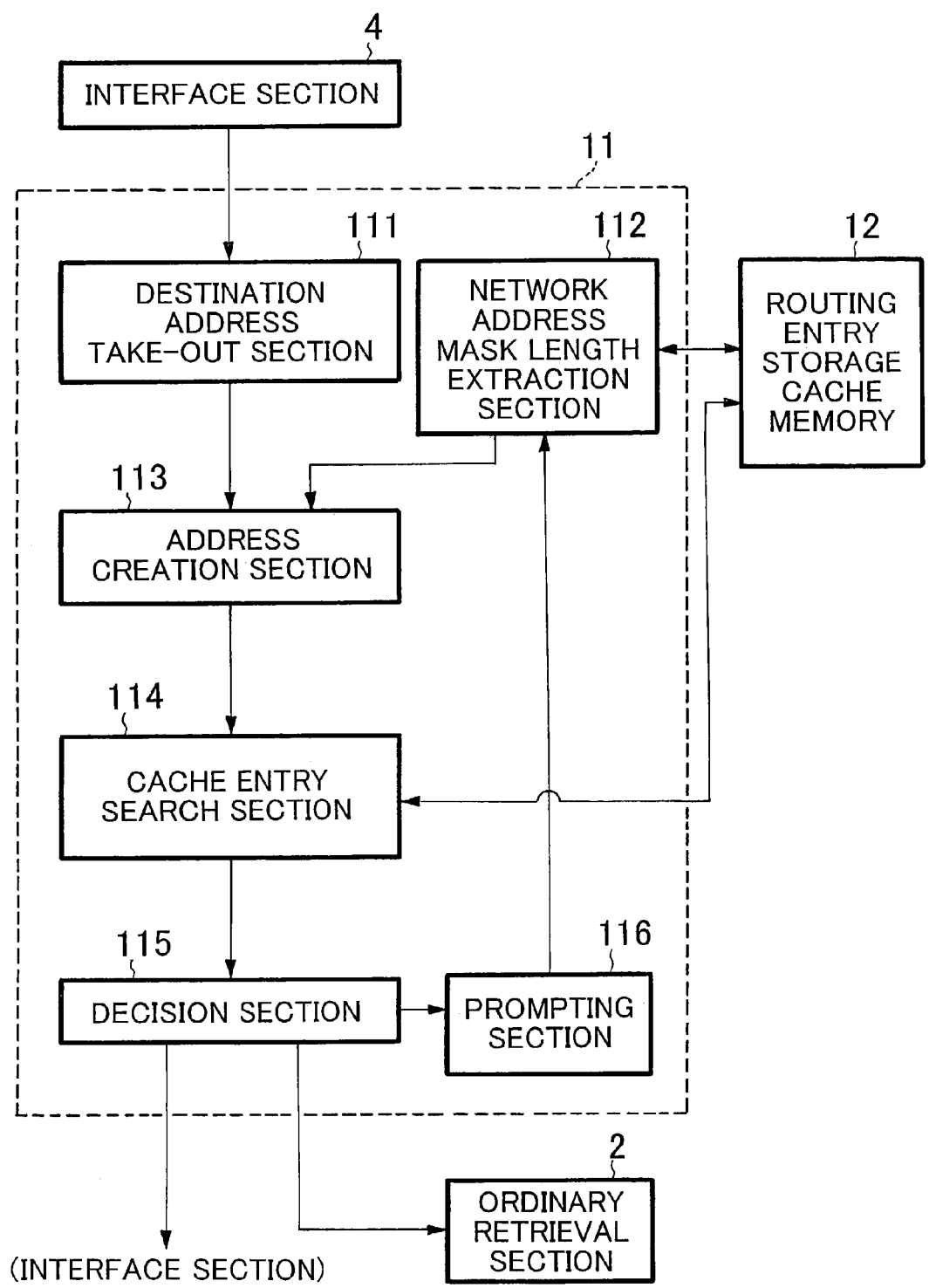
FIG. 2 is functional block diagram for showing a schematic internal configuration of a cache retrieval-processing section.

FIG. 2 is functional block diagram for showing a schematic internal configuration of the cache retrieval-processing section 11.

In FIG. 2, the cache retrieval-processing section 11 functionally includes a destination address take-out section 111, a network address mask length extraction section 112, an address creation section 113, a cache entry search section 114, a decision section 115, and a prompting section 116.

The take-out section 111 takes out a destination address such as a destination IP address of a packet input to the interface 4.

The extraction section 112 extracts a network address mask length in the cache memory 12.

The creation section 113 creates an address by an AND operation between the destination address taken out by the take-out section 111 and a minimum network address mask length extracted by the extraction section 112.

The cache entry search section 114 searches the cache memory 12 for a cache entry as considering an address created by the creation section 113 to be a virtual network address.

The decision section 115 decides whether a cache entry, if found in the cache memory 12 as a result of search by the search section 115, is a link entry constituted of an entry group to which the cache entry relates.

The prompting section 116 prompts the extraction section to take out a network address mask length larger than a network address mask length extracted earlier until the decision section decides that the cache entry once decided to be the link entry as a result of decision by the decision section is not a link entry.

The ordinary retrieval section 2 comprises a routing table storage memory (memory) 22, a routing table retrieval processing section 21, and a caching processing section 23.

The memory 22 has a routing table for storing routing caches including routing information relating a destination IP address of an input packet to a routing path (next hop or router).

The routing table retrieval processing section 21 performs retrieval in the memory 22 in response to a retrieval request sent from the high-speed retrieval section 1, to output a retrieval result.

The caching processing section 23 stores the retrieval result from the routing table retrieval processing section 21 into the cache memory 12.

Figure 3:
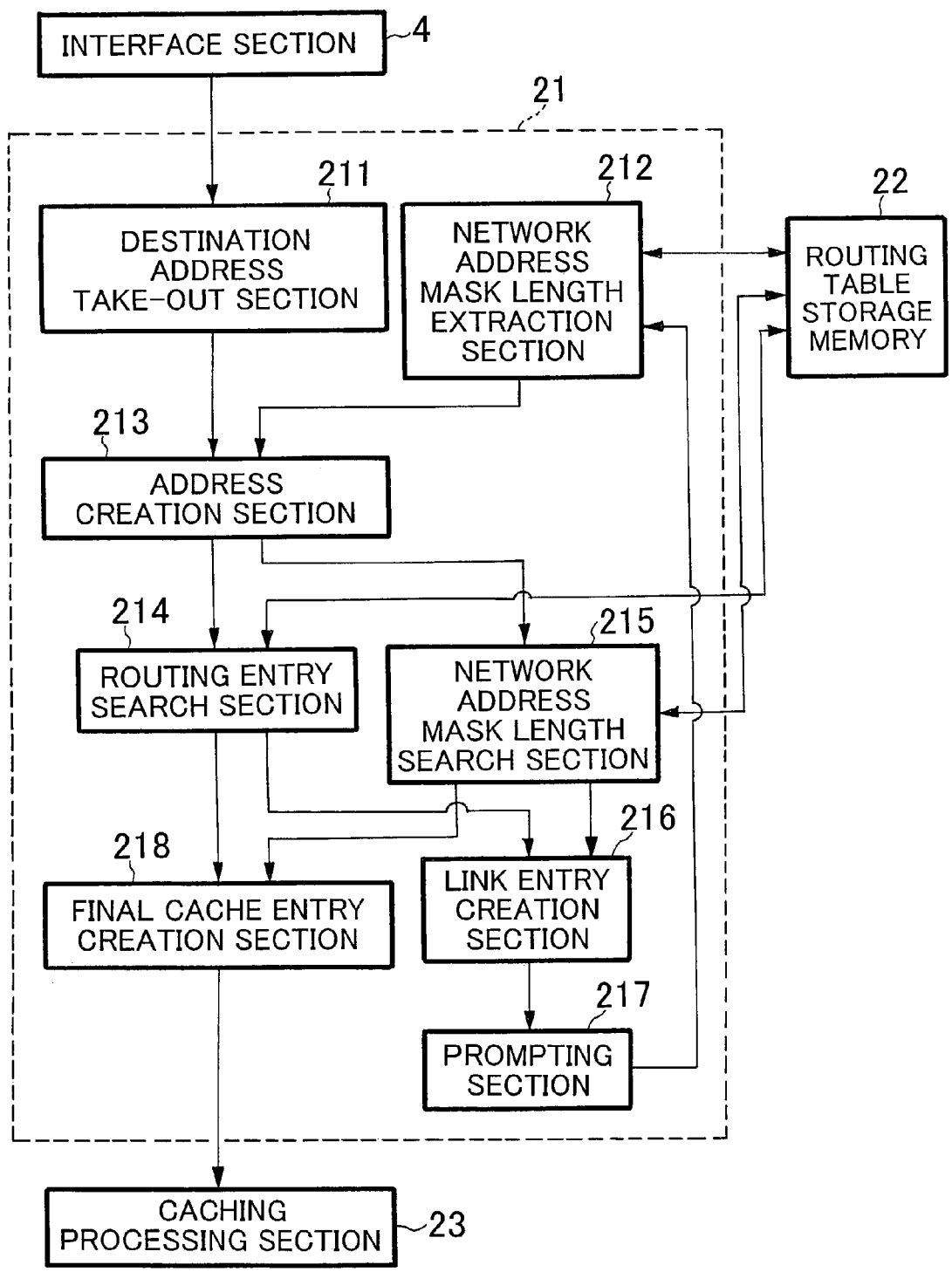
FIG. 3 is functional block diagram for showing a schematic internal configuration of a routing table retrieval processing section.

FIG. 3 is functional block diagram for showing a schematic internal configuration of the routing table retrieval processing section 21.

In FIG. 3, the routing table retrieval processing section 21 functionally comprises a destination address take-out section 211, an network address mask length extraction section 212, an address creation section 213, a routing entry search section 214, a network address mask length search section 215, a link entry creation section 216, a prompting section 217, and a final cache entry creation section 218.

The take-out section 211 takes out a destination address of a packet inputted to the interface 4.

The extraction section 212 extracts a network address mask length from the memory 22.

The address creation section 213 creates an address by an AND operation between a destination address taken out by the take-out section 211 and a network address mask length extracted by the extraction section 212.

The routing entry search section 214 searches the memory 22 for a routing entry that indicates an address created by the address creation section 213.

The network address mask length search section 215 searches the memory 22 for a minimum network address mask length of those larger than a network address mask length extracted earlier by the extraction section 212, from a routing entry group contained in an address created by the address creation section 213.

The link entry creation section 216 creates a link entry if results of searching by the search sections 214 and 215 indicate that the routing entry is not present and the minimum network address mask length is present.

The prompting section 217 prompts the extraction section to take out a network address mask length larger than a network address mask length extracted earlier after a linking cache entry is created by the link entry creation section 216 if the results of searching by the search sections 214 and 215 indicate that the routing entry and the minimum network address mask length are present.

The final cache entry creation section 218 creates a final cache entry that stores information necessary for routing if the results of searching by the search sections 214 and 215 indicate that neither the routing entry nor the minimum network address mask length is present.

The cache management section 3 functionally comprises a routing table management-processing section 31, a cache management-processing section 32, and a cache monitoring timer processing section 33.

The routing table management-processing section 31 processes a routing table update request sent from a routing protocol to update the memory 22 and post an update result to the cache management-processing section 32.

The cache management-processing section 32 manages a state of the cache memory 12 based on a post from the routing table management-processing section 31, to update contents of the cache memory 12 if necessary.

The cache monitoring timer processing section 33 deletes a cache entry having a low usage frequency as monitoring the cache entries in the cache memory 12.

Figure 4:
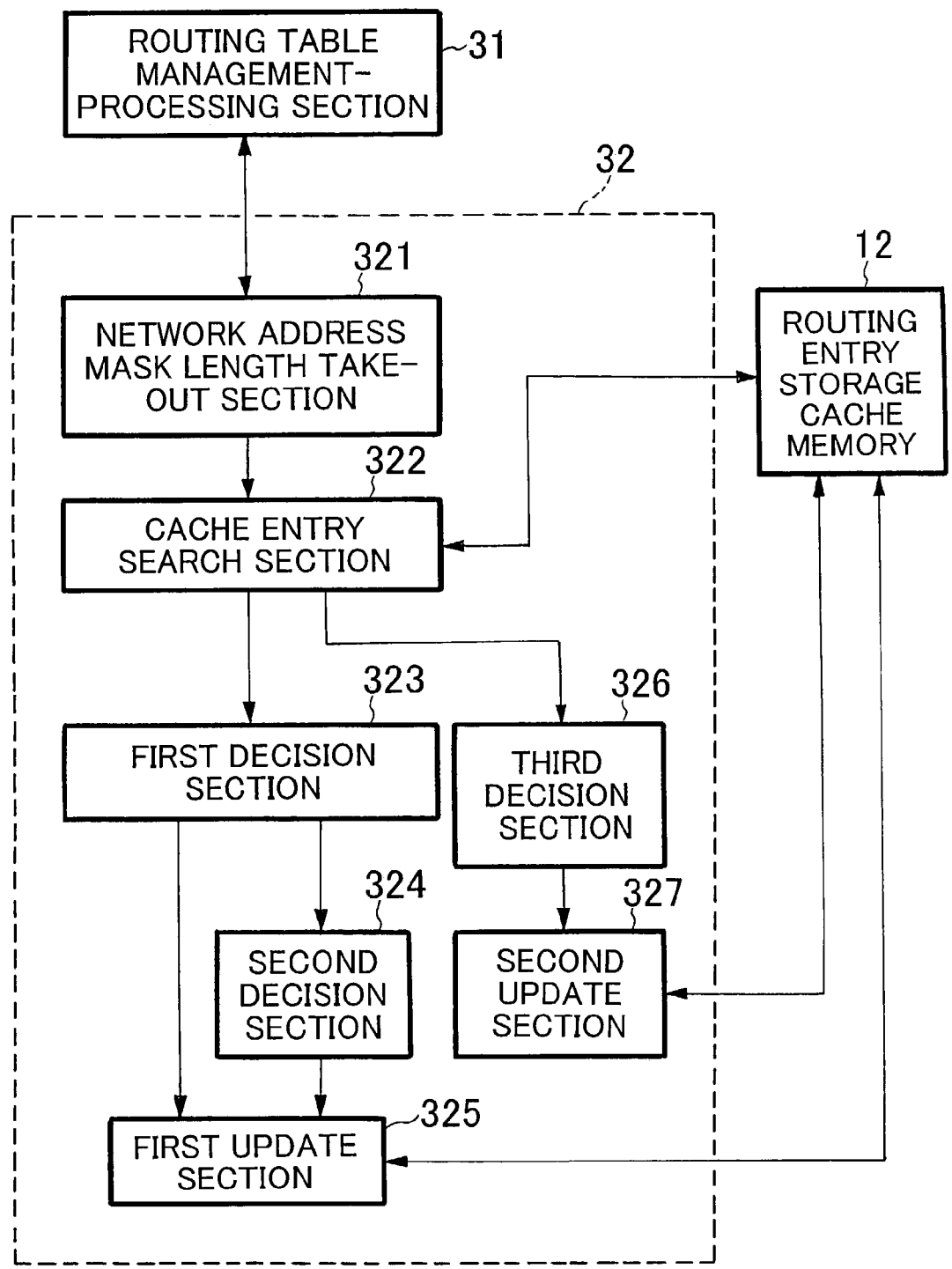
FIG. 4 is functional block diagram for showing a schematic internal configuration of a cache management-processing section 32.

FIG. 4 is functional block diagram for showing a schematic internal configuration of the cache management-processing section 32.

In FIG. 4, the cache management-processing section 32 functionally comprises a network address mask length take-out section 321, a cache entry search section 322, a first decision section 323, a second decision section 324, a first update section 325, a third decision section 326, and a second update section 327.

The network address mask length take-out section 321 takes out a network address mask length of a network address of a routing entry if the routing entry is added to the memory 22.

The cache entry search section 322 searches for a cache entry having a maximum mask length of the cache entries containing the network address.

The first decision section 323 decides whether a cache entry, if found as a result of searching by the search section 322, indicates link processing.

The second decision section 324 decides whether a next network address mask length used in the link processing indicated by the cache entry is smaller than an added network address mask length, if a result of decision by the first decision section 323 indicates that the cache entry indicates the link processing.

The first update section 325 updates the network address mask length to a next network address mask length used in the link processing in the cache entry, if the result of decision by the first decision section indicates that the cache entry does not indicate the link processing or if a result of decision by the second decision section 324 indicates that the next network address mask length used in the link processing indicated by the cache entry is larger than the added network address mask length.

The third decision section 326 decides whether a minimum network address mask length is less than a network address mask length of an added routing entry, if the cache entry is not found as a result of searching by the cache entry search section 322.

The second update section 327 updates the minimum network address mask length to the network address mask length of the added routing entry, if a result of decision by the third decision section indicates that the minimum network address mask length is less than the network address mask length of the added routing entry.

[Explanation of Operations]

Figure 5:
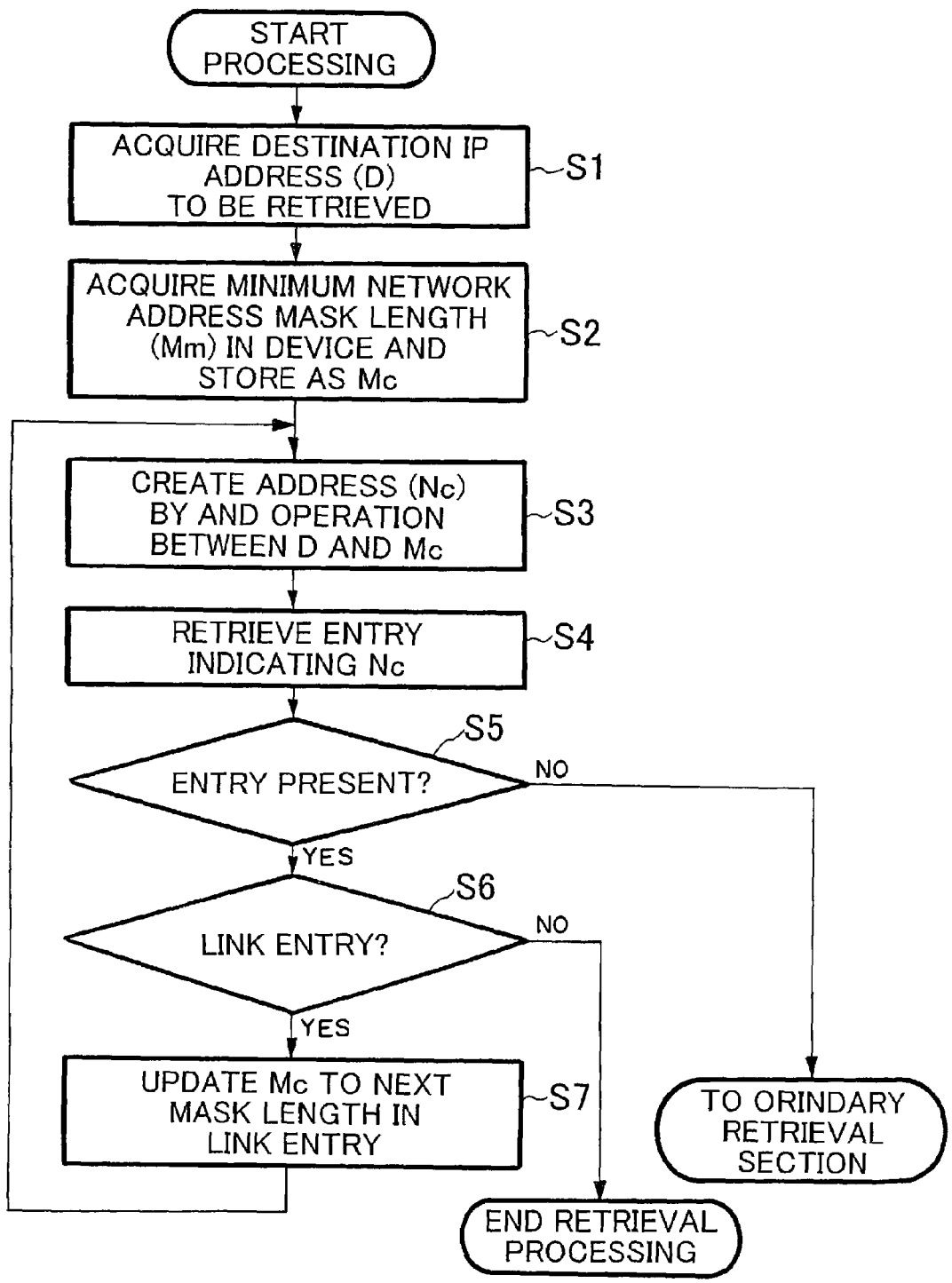
FIG. 5 is a flowchart for showing operations of a high-speed retrieval section 1 of FIG. 1.

The following will describe operations of a router shown in FIG. 1. FIG. 5 is a flowchart showing operations of the high-speed retrieval section 1 of FIG. 1.

First, the cache retrieval-processing section 11 takes out a destination IP address D of a packet input to the router device (step S1). Then, the cache retrieval-processing section 11 takes out a minimum network address mask length Mm from a routing table provided to the device and stores it as a network address mask length Mc (step S2).

Then, the cache retrieval-processing section 11 creates an IP address Nc by an AND operation between the destination IP address D and the network address mask length Mc (step S3). The cache retrieval-processing section 11 then searches the cache memory 12 for entries as considering the IP address Nc to be a virtual network address (step S4).

The cache retrieval-processing section 11 decides whether any cache entry is found as a result of searching the cache memory 12 for the cache entries (step S5). If no cache entry is found as a result of decision, cache retrieval processing is ended, to cause the ordinary retrieval section 2 to continue the processing. If a cache entry is found as a result of decision, on the other hand, the cache retrieval-processing section 11 further decides whether the cache entry is a link entry (step S6).

If a result of decision indicates that the cache entry is not a link entry, the cache retrieval-processing section 11 decides that a cache entry of interest is present in the cache memory 12, ends retrieval processing, and outputs contents of the cache entry as a retrieval result.

If, on the other hand, the result of decision indicates that the found cache entry is a link entry, which means that a network having a mask length larger than the mask length Mc of the current network address is present in the routing table, the cache retrieval-processing section 11 takes out a new network address mask length from the link entry, to update Mc (step S7). Then, the process returns to step S3.

Figure 6:
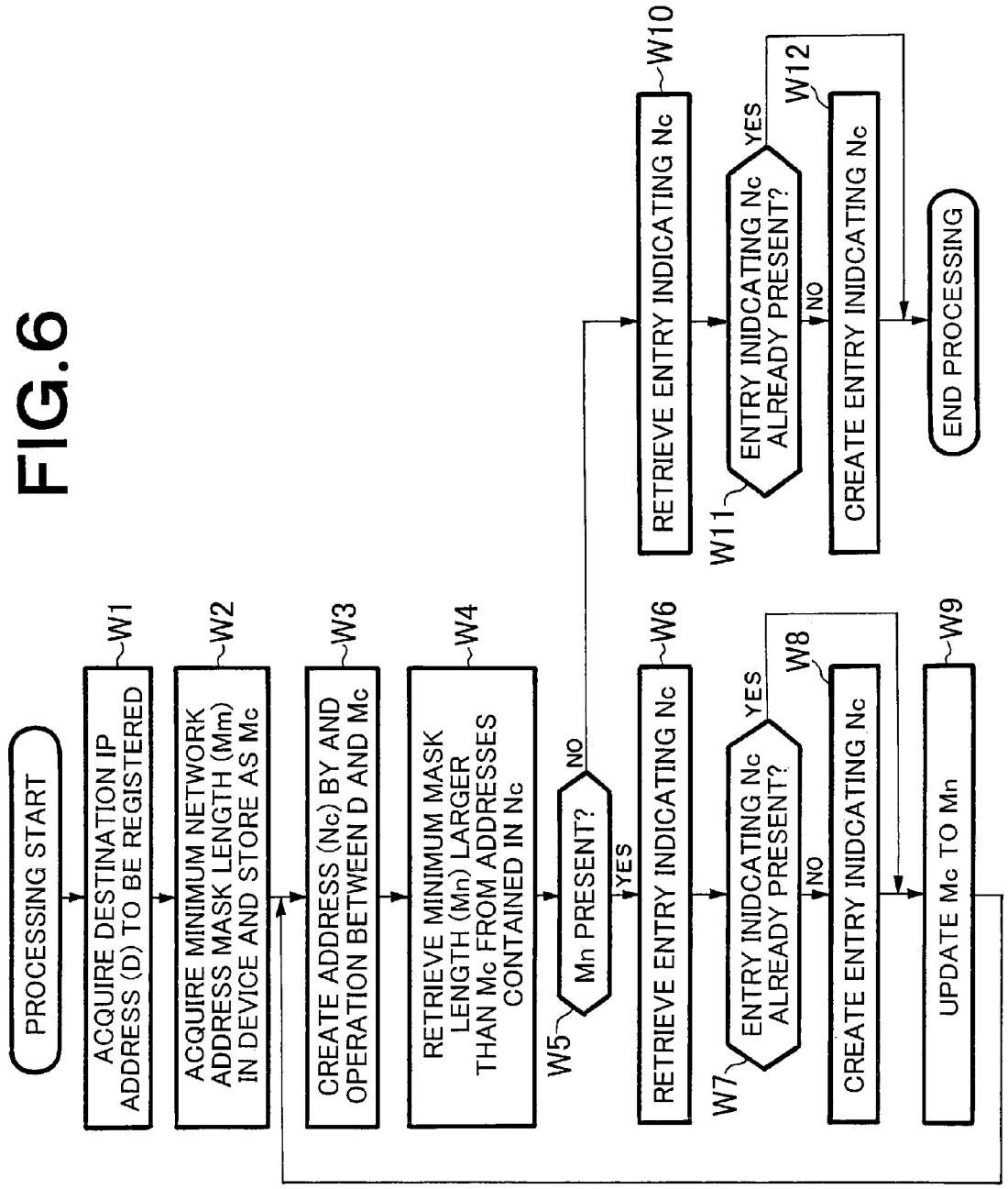
FIG. 6 is a flowchart for showing operations of an ordinary retrieval section 2 of FIG. 1.

FIG. 6 is a flowchart showing operations of the ordinary retrieval section 2 of FIG. 1.

First, the routing table retrieval-processing section 21 receives the destination IP address D that has not been matched in caching at the cache retrieval-processing section 11, to retrieve a routing entry of the memory 22 by using a typical routing table retrieval algorithm.

A routing entry, if found as a result of retrieval, is passed together with the destination IP address D to the caching processing section 23. The caching processing section 23 acquires the destination IP address D from the routing table retrieval-processing section 21 (step W1).

Next, the routing table retrieval-processing section 21 takes out the minimum network address mask length Mc from the memory 22 (step W2). Next, the routing retrieval-processing section 21 creates the IP address Nc by an AND operation between the destination IP address D and the network address mask length Mc (step W3).

Then, the routing table retrieval-processing section 21 searches, as considering the IP address Nc to be a virtual network address, the memory 22 for a minimum mask length Mn larger than the minimum network address mask length Mc from a routing entry group contained in the IP address Nc (step W4).

The routing table retrieval-processing section 21 decides whether the minimum mask length Mn larger than the minimum network address mask length Mc is found as a result of searching the memory 22 (step W5).

If a result of decision indicates that the minimum mask length Mn is present larger than the minimum network address mask length Mc, a cache entry indicating the IP address Nc is searched for (step W6).

The process then decides whether a cache entry indicating the IP address Nc is present (step W7).

If a result of decision indicates that no entry indicating the IP address Nc is present, the process creates a link entry indicating the IP address Nc that newly stores the mask length Mn to be retrieved next (step W8). If the result of decision indicates that an entry indicating the IP address Nc is present, on the other hand, the process does not create a link entry. Instead, the process updates the minimum network address mask length to the mask length Mn (step W9). Then, the process returns to step W3.

If the result of decision indicates that the mask length Mn is not present, on the other hand, the process searches for a cache entry indicating the IP address Nc (step W10).

Next, the process decides whether a cache entry indicating the IP address Nc is present (step W11).

If a result of decision indicates that the cache entry is not present, the process creates a final cache entry that stores information necessary to perform routing such as output interfacing or next hopping (step W12). Then, the process ends processing.

If the result of decision indicates that the cache entry is present, on the other hand, the process ends the processing without creating the final cache entry.

Figure 7:
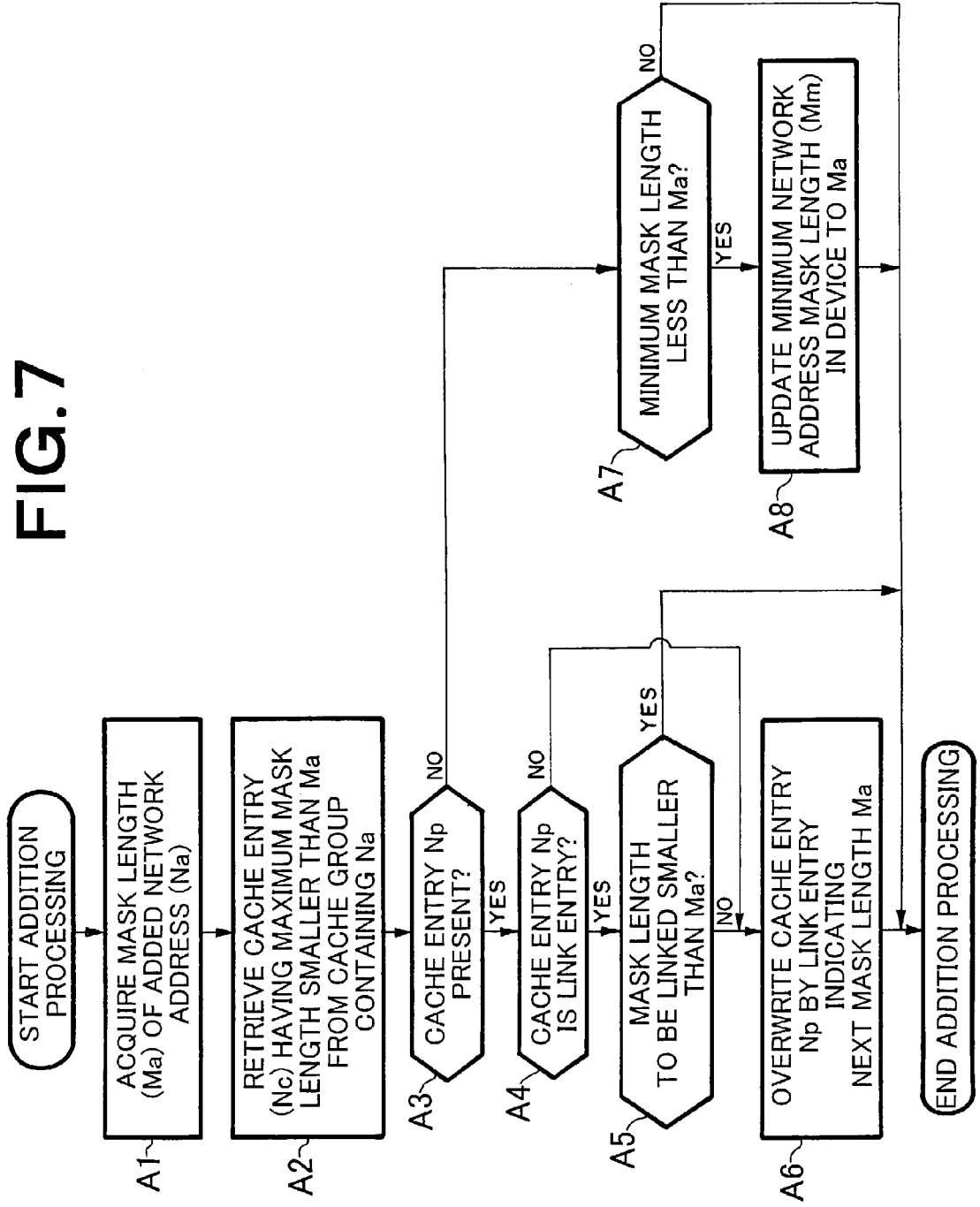
FIG. 7 is a flowchart for showing operations of a cache management section 3 of FIG. 1.
Figure 8:
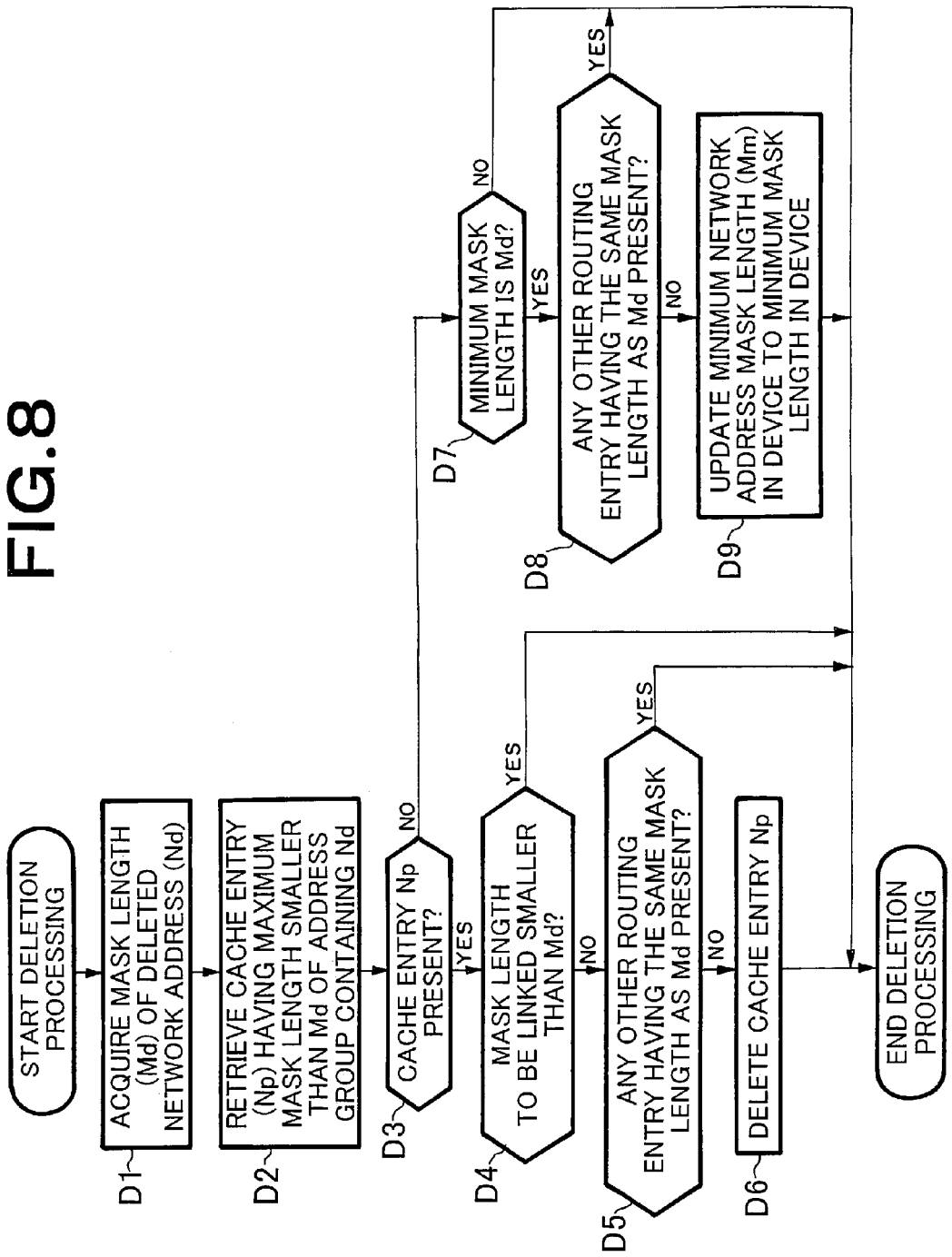
FIG. 8 is another flowchart for showing the operations of the cache management section 3 of FIG. 1.

FIGS. 7 and 8 are flowcharts for showing operations of the cache management section 3 of FIG. 1.

A routing table management-processing section 31 detects a variation in a routing table by either using a typical routing protocol or changing settings to the device and outputs to a cache management-processing section 32 information of addition of a routing entry to or deletion thereof from the routing table.

Based on the information output from the routing table management-processing section 31, the cache management-processing section 32 alters or deletes the cache entries in the cache memory 12.

When an routing entry is added, first the process takes out a network address mask length Ma of a network address Na of the added routing entry (step A1 of FIG. 4).

Further, the process searches for a cache entry Np having a maximum mask length of the cache entries containing the added network address Na (step A2). The process then decides whether the cache entry Np is found (step A3).

If the cache entry Np is found as a result of decision at step S3, the process decides whether the cache entry Np indicates link processing (step A4).

If a result of decision at step A4 indicates that the cache entry Np indicates link processing, the process decides whether a next network address mask length used in the link processing indicated by the cache entry Np is smaller than the added network address mask length Ma (step A5).

If a result of decision at step A4 indicates that the cache entry Np does not indicate link processing or if a result of decision at step A5 indicates that the next network address mask length used in the link processing indicated by the cache entry Np is larger than the added network address mask length Ma, the process updates a next network address mask length used in the link processing in the cache entry Np to the network address mask length Ma, thereby ending the processing (step A6).

If the result of decision at step A5 indicates that the next network address mask length used in the link processing indicated by the cache entry Np is not larger than the added network address mask length Ma, the process ends processing shown in FIG. 4.

If the cache entry is not found at step A3, the process decides whether the minimum network address mask length Mm is less than the network address mask length Ma of the added routing entry (step A7).

If a result of decision at step A7 indicates that the minimum network address mask length Mm is less than the network address mask length Ma of the added routing entry, the process updates the minimum network address mask length Mm to the network address mask length Ma of the added routing entry (step A8).

If the minimum network address mask length Mm is not less than the network address mask length Ma of the added routing entry, the process ends the processing shown in FIG. 4.

If a routing entry is deleted, first the process takes out a network address mask length Md of a network address Nd of the deleted routing entry (step D1 of FIG. 5).

Next, the process searches for the cache entry Np having the maximum length of the cache entries containing the deleted network address Nd (step D2). Then, the process decides whether the cache entry Np is found (step D3).

If the cache entry Np, which indicates link processing, is found at step D3, the process decides whether a next network address mask length used in the link processing indicated by the cache entry Np is smaller than the deleted network address mask length Md (step D4).

If a result of decision at step D4 indicates that the next network address mask length used in the link processing is not less than the deleted network address mask length Md, the process searches for any other routing entry having the same mask length as the deleted network address mask length Md from the routing entries containing the deleted network address Nd (step D5).

If a result of decision at step D5 indicates that no other routing entry is present, the cache entry Np is deleted (step D6). If the result of decision at step D4 indicates that the next network address mask length used in the link processing is smaller than the deleted network address mask length Md or that the result of decision at step D5 indicates that any other routing entry is present, the process ends processing shown in FIG. 5.

If the cache entry Np is not found at step D3, the process decides whether the minimum network address mask length Mm is the network address mask length Md of the deleted routing entry (step D7).

If a result of decision at step D7 indicates that the minimum network address mask length Mm is the network address mask length Md of the deleted routing entry, the process searches for any other routing entry having the same mask length as the deleted network address mask length Md from the routing entries containing the deleted network address Nd (step D8).

If no other routing entry is found at step D8, the process updates the minimum network address mask length Mm to a mask length of a routing entry having the minimum mask length (step D9).

If the result of decision at step D7 indicates that the minimum network address mask length Mm is not the network address mask length Md of the deleted routing entry or any other routing entry is found at step D8, the process ends the processing shown in FIG. 5.

The cache monitoring timer processing section 33 monitors the routing entry storage cache memory 12, to delete a cache entry that has not been used for at least a constant time.

In the embodiment of the present invention, either dedicated hardware for high-speed retrieval may be provided or an equivalent logic may be constituted of software.

As described above, by the present invention, since only routing entries in a utilized routing table are cached, it is possible is to reduce a capacity of a cache memory for storing the entries and also reduce a size of a retrieval engine itself because the cache memory subject to retrieval is thus reduced in size.

Therefore, the cache memory can be reduced in capacity, thereby reducing a product cost. Further, a reduction in capacity of the cache memory makes it possible to improve a retrieval throughput.

What is claimed is:

1. A router device for routing a packet based on its destination address, comprising:
    a routing table for storing routing entries including routing information relating the destination address of the packet to a routing path;
    a cache memory for storing some of the routing entries in the routing table together with mask-length information of the destination address as a cache entry;
    a first retrieval section for retrieving the cache entry which corresponds to the destination address of the packet by making reference to the cache memory based on the destination address;
    a second retrieval section for retrieving the routing entry which corresponds to the destination address by making reference to the routing table;
    a storage section for storing the routing entry retrieved by the second retrieval section together with the mask-length information of the destination address as the cache entry in the cache memory; and
    an output section for outputting a retrieval result sent from the first or second retrieval section,
    wherein the first retrieval section comprises,
    a take-out section for taking out the destination address of the input packet,
    an extraction section for extracting a mask length of a network address from the routing table,
    a creation section for creating an address by an AND operation between the destination address and a minimum mask length among the mask lengths,
    a search section for searching the cache memory for the cache entry by regarding the created address to be a virtual network address,
    a decision section for deciding whether the cache entry is a link entry comprising an entry group to which the cache entry relates, if the cache entry is searched, and
    a prompting section for prompting the extraction section to take out the mask length larger than the mask length extracted earlier, until the decision section decides which the cache entry once decided to be the link entry is not the link entry.

2. The router device according to claim 1, wherein:
    the first retrieval section retrieves the cache memory before the second retrieval section retrieves the routing table; and
    the second retrieval section retrieves the routing entry if the cache entry corresponding to the destination address is not present in the cache memory.

3. A router device for routing a packet based on its destination address, comprising:
    a routing table for storing routing entries including routing information relating the destination address of the packet to a routing path;
    a cache memory for storing some of the routing entries in the routing table together with mask-length information of the destination address as a cache entry;
    a first retrieval section for retrieving the cache entry which corresponds to the destination address of the packet by making reference to the cache memory based on the destination address;
    a second retrieval section for retrieving the routing entry which corresponds to the destination address by making reference to the routing table;
    a storage section for storing the routing entry retrieved by the second retrieval section together with the mask-length information of the destination address as the cache entry in the cache memory; and
    an output section for outputting a retrieval result sent from the first or second retrieval section,
    wherein the second retrieval section comprises,
    a take-out section for taking out the destination address of the input packet,
    an extraction section for extracting a mask length of a network address from the routing table,
    a first creation section for creating an address by an AND operation between the destination address and the mask length,
    a first search section for searching the routing table for the routing entry which indicates the created address,
    a second search section for searching the routing table for a minimum mask length among the mask lengths larger than the mask length extracted earlier by the extraction section, from a routing entry group contained in the created address,
    a second creation section for creating a link entry if the routing entry is not present and the minimum mask length is present by the searched results,
    a prompting section for prompting the extraction section to take out the mask length larger than the mask length extracted earlier after the link entry is created if the routing entry and the minimum network address mask length are present by the searched results, and
    a third creation section for creating a final cache entry that stores information necessary for routing if neither the routing entry nor the minimum network address mask length is present by the searched results.

4. A router device for routing a packet based on its destination address, comprising:
    a routing table for storing routing entries including routing information relating the destination address of the packet to a routing path;
    a cache memory for storing some of the routing entries in the routing table together with mask-length information of the destination address as a cache entry;

a first retrieval section for retrieving the cache entry which corresponds to the destination address of the packet by making reference to the cache memory based on the destination address;

a second retrieval section for retrieving the routing entry which corresponds to the destination address by making reference to the routing table;

a storage section for storing the routing entry retrieved by the second retrieval section together with the mask-length information of the destination address as the cache entry in the cache memory;

an output section for outputting a retrieval result sent from the first or second retrieval section; and a cache management section for managing states of the cache memory and the routing table, wherein the cache management section comprises, a takeout section for taking out a mask length of a network address of the routing entry if the routing entry is added to the routing table, a search section for searching for the cache entry having a maximum mask length of the cache entries containing the network address, a first decision section for deciding whether the cache entry indicates link processing if the cache entry having the maximum mask length is found by the searched results, a second decision section for deciding whether a next mask length of the network address used in the link processing indicated by the cache entry is smaller than an added mask length, if the cache entry indicates link processing by a result of decision by the first decision section, a first update section for updating the mask length to the next mask length used in the link processing in the cache entry, if the cache entry does not indicate the link processing as a result of decision by the first decision section, or if the next mask length used in the link processing indicated by the cache entry is larger than the added mask length as a result of decision by the second decision section, a third decision section for deciding whether the minimum mask length is less than the mask length of the added routing entry, if the cache entry is not found as a result of search by the search section, and a second update section for updating the minimum mask length to the mask length of the added routing entry, if the minimum mask length is less than the mask length of the added routing entry as a result of decision by the third decision section.

5. The router device according to claim 4, wherein the cache management section further comprises:

a second take-out section for taking out the mask length of the network address of the routing entry if the routing entry is deleted from the routing table;

a second search section for searching for the cache entry having a maximum mask length from the cache entries containing the network address;

a third decision section for deciding whether a next mask length of the network address used in link processing indicated by the cache entry is smaller than a mask length of a network address of deleted routing entry, if the cache entry is found as a result of search by the second search section;

a third search section for searching for any other routing entry having the same mask length as the deleted network address mask length from the routing entries containing a deleted network address, if the next mask length used in the link processing is larger than the deleted mask length as a result of decision by the third decision section;

a deletion section for deleting the cache entry searched by the second search section, if the other routing entry is not present as a result of searching by the third search section;

a fourth decision section for deciding whether the minimum mask length is the mask length of the deleted routing entry, if the cache entry is not found by as a result of searching by the second search section;

a third search section for searching for any other routing entry having the same mask length as the deleted mask length from the routing entries containing the deleted network address, if the minimum mask length is the mask length of the deleted routing entry as a result of decision by the fourth decision section; and a third update section for updating the minimum mask length to the mask length of the routing entry having the minimum mask length of the routing entries in the routing table, if the other routing entry is not found as a result of search by the third search section.

6. The router device according to claim 4, wherein the cache management section monitors the cache memory and deletes the cache entry that has not been used for at least a constant time.

7. A routing method of routing a packet based on its destination address, comprising the steps of:

storing routing entries including routing information relating the destination address of the packet to a routing path in a routing table;

storing some of the routing entries in the routing table together with mask-length information of the destination address as a cache entry in a cache memory;

firstly retrieving the cache entry which corresponds to the destination address of the packet by making reference to the cache memory based on the destination address;

secondly retrieving the routing entry which corresponds to the destination address by making reference to the routing table;

storing the routing entry retrieved by the second retrieval section together with the masklength information of the destination address as the cache entry in the cache memory; and outputting a retrieval result sent from the first or second retrieval section, wherein the firstly retrieving step comprises the steps of, taking out the destination address of the input packet, extracting a mask length of network address in the routing table, creating an address by an AND operation between the destination address and a minimum mask length among the mask lengths, searching the cache memory for the cache entry by regarding the created address to be a virtual network address, deciding whether the cache entry is a link entry comprising an entry group to which the cache entry relates, if the cache entry is searched, and prompting the extraction step to take out the mask length larger than the mask length extracted earlier, until the decision step decides that the cache entry once decided to be the link entry is not the link entry.

8. The routing method according to claim 7, wherein:

the firstly retrieving step retrieves the cache memory before the second retrieval section retrieves the routing table; and the secondly retrieving step retrieves the routing entry if the cache entry corresponding to the destination address is not present in the cache memory.

9. A routing method of routing a packet based on its destination address, comprising the steps of:
storing routing entries including routing information relating the destination address of the packet to a routing path in a routing table;
storing some of the routing entries in the routing table together with mask-length information of the destination address as a cache entry in a cache memory;
firstly retrieving the cache entry which corresponds to the destination address of the packet by making reference to the cache memory based on the destination address;
secondly retrieving the routing entry which corresponds to the destination address by making reference to the routing table;
storing the routing entry retrieved by the second retrieval section together with the mask-length information of the destination address as the cache entry in the cache memory; and
outputting a retrieval result sent from the first or second retrieval section,
wherein the secondly retrieving step comprises the steps of,
taking out the destination address of the input packet,
extracting a mask length of a network address from the routing tablet,
creating an address by an AND operation between the destination address and the mask length,
searching the routing table for the routing entry that indicates the created address,
searching the routing table for a minimum mask length among the mask lengths larger than the mask length extracted earlier by the extraction step, from a routing entry group contained in the created address,
creating a link entry if the routing entry is not present and the minimum mask length is present by the searched results,
prompting the extraction section to take out the mask length larger than the mask length extracted earlier after the link entry is created if the routing entry and the minimum network address mask length are present by the searched results, and
creating a final cache entry that stores information necessary for routing if neither the routing entry nor the minimum network address mask length is present by the searched results.

10. A routing method of routing a packet based on its destination address, comprising the steps of:
storing routing entries including routing information relating the destination address of the packet to a routing path in a routing table;
storing some of the routing entries in the routing table together with mask-length information of the destination address as a cache entry in a cache memory;
firstly retrieving the cache entry which corresponds to the destination address of the packet by making reference to the cache memory based on the destination address;
secondly retrieving the routing entry which corresponds to the destination address by making reference to the routing table;
storing the routing entry retrieved by the second retrieval section together with the mask-length information of the destination address as the cache entry in the cache memory;
outputting a retrieval result sent from the first or second retrieval section; and
managing states of the cache memory and the routing table,
wherein the managing step comprises the steps of,
taking out a mask length of a network address of the routing entry if the routing entry is added to the routing table,
searching for the cache entry having a maximum mask length of the cache entries containing the network address,
deciding whether the cache entry indicates link processing if the cache entry having the maximum mask length is found by the searched results,
deciding whether a next mask length of the network address used in the link processing indicated by the cache entry is smaller than an added mask length, if the cache entry indicates link processing by a result of decision by the first decision section,
updating the mask length to the next mask length used in the link processing in the cache entry, if the cache entry does not indicate the link processing as the result of decision, or if the next mask length used in the link processing indicated by the cache entry is larger than the added mask length as the result of decision,
deciding whether the minimum mask length is less than the mask length of the added routing entry, if the cache entry is not found as the result of the searching step, and
updating the minimum mask length to the mask length of the added routing entry, if the minimum mask length is less than the mask length of the added routing entry as the result of decision.

11. The routing method according to claim 10, wherein the managing step further comprises the steps of:
taking out the mask length of the network address of the routing entry if the routing entry is deleted from the routing table;
searching for the cache entry having a maximum mask length from the cache entries containing the network address;
deciding whether a next mask length of the network address used in link processing indicated by the cache entry is smaller than a mask length of a network address of deleted routing entry, if the cache entry is found as the result of search;
searching for any other routing entry having the same mask length as the deleted network address mask length from the routing entries containing a deleted network address, if the next mask length used in the link processing is larger than the deleted mask length as the result of decision;
deleting the searched cache entry, if the other routing entry is not present as the result of search;
deciding whether the minimum mask length is the mask length of the deleted routing entry, if the cache entry is not found by as the result of search;
searching for any other routing entry having the same mask length as the deleted mask length from the routing entries containing the deleted network address, if the minimum mask length is the mask length of the deleted routing entry as the result of decision; and
updating the minimum mask length to the mask length of the routing entry having the minimum mask length of the routing entries in the routing table, if the other routing entry is not found as the result of search.

12. The routing method according to claim 10, wherein the managing step comprises the steps of:
monitoring the cache memory; and
deleting the cache entry that has not been used for at least a constant time.

* * * * *